US009831790B2

(12) United States Patent
Mizushima et al.

(10) Patent No.: US 9,831,790 B2
(45) Date of Patent: Nov. 28, 2017

(54) DC-TO-DC CONVERTER

(71) Applicants: ALPS ELECTRIC CO., LTD., Tokyo (JP); TDK CORPORATION, Tokyo (JP)

(72) Inventors: Takao Mizushima, Tokyo (JP); Masahiro Iizuka, Tokyo (JP); Yutaka Naito, Tokyo (JP); Kinshiro Takadate, Tokyo (JP); Kazuki Iwaya, Tokyo (JP); Eiichi Takahashi, Tokyo (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 41 days.

(21) Appl. No.: 14/857,323

(22) Filed: Sep. 17, 2015

(65) Prior Publication Data
US 2016/0079866 A1 Mar. 17, 2016

(30) Foreign Application Priority Data

Sep. 17, 2014 (JP) .................................. 2014-189453
Feb. 4, 2015 (JP) ................................... 2015-20210

(51) Int. Cl.
*H02M 3/335* (2006.01)
*H02M 3/337* (2006.01)
*H02M 1/00* (2006.01)

(52) U.S. Cl.
CPC .. *H02M 3/3376* (2013.01); *H02M 2001/0032* (2013.01); *H02M 2001/0058* (2013.01); *Y02B 70/1491* (2013.01); *Y02B 70/16* (2013.01)

(58) Field of Classification Search
CPC . H02M 2001/0052; H02M 2001/0058; H02M 2007/4815; H02M 2007/4811; H02M 7/4826; H02M 1/083; H02M 3/33507; Y02B 70/1491
USPC ............................... 323/236, 319; 363/21.03
See application file for complete search history.

(56) References Cited

U.S. PATENT DOCUMENTS

| 8,199,530 | B2 * | 6/2012 | Sase .................. H02M 3/33576 363/17 |
| 2013/0100707 | A1 | 4/2013 | Hatakeyama et al. |
| 2015/0155788 | A1 * | 6/2015 | Wagner ............... H02M 3/3376 363/21.03 |

FOREIGN PATENT DOCUMENTS

JP        2004-260928        9/2004

OTHER PUBLICATIONS

Naito, Yutaka, "29th Switching Power Supply Technology Symposium," Techno Frontier, 2014, 17 pages.
(Continued)

*Primary Examiner* — Timothy J Dole
*Assistant Examiner* — Lorena Bruner
(74) *Attorney, Agent, or Firm* — Brinks Gilson & Lione

(57) ABSTRACT

A DC-to-DC converter includes a voltage converter having: a capacitance; at least one inductor configured to store energy and exchange stored energy with the capacitance; and a switching element configured to switch on and off a current flowing through the inductor and change direction of the current at each switching. The inductor includes a variable inductor whose inductance decreases with increase in the current.

7 Claims, 13 Drawing Sheets

(56) References Cited

OTHER PUBLICATIONS

Kitamura, Mamoru, "Designing and Trial Production of Phase-Shifted Full Bridge ZVS Power Supply," Green Electronics Series, 2010, 7 pages.
Shoji, Kazu et al., "Improvement of Output Voltage Characteristics for Isolated DC-DC Converter Using Dust Core," The Institute of Electrical Engineers of Japan, 2014, 7 pages.

\* cited by examiner

Inductor 1

Inductor 2

Inductor 3

Inductor 4

Inductor 5

Inductor 6

Inductor 7

DC-TO-DC CONVERTER

CLAIM OF PRIORITY

This application claims benefit of Japanese Patent Application No. 2014-189453 filed on Sep. 17, 2014 and Japanese Patent Application No. 2015-20210 filed on Feb. 4, 2015, which are hereby incorporated by reference.

BACKGROUND OF THE INVENTION

1. Field of the Invention

The present invention relates to DC-to-DC converter employing a switching circuit.

2. Description of the Related Art

FIG. 11 is a circuit diagram of a conventional isolated-type DC-to-DC converter. For example, this type of DC-to-DC converter is disclosed in "Green Electronics No. 1, Designing of Highly Efficient, Low-Noise Power Supply Circuit" published by CQ Publishing Co., Ltd. on Apr. 1, 2010 (hereinafter referred to as Non-patent Document 1).

This DC-to-DC converter is a device capable of converting DC power to AC power, transforming the AC power with a transformer, and converting the transformed AC power to DC power with a rectifier circuit for output. In the conventional device shown in FIG. 11, a full bridge circuit is employed for DC to AC conversion. In the full bridge circuit, switching elements Sa and Sb are connected in series, and switching elements Sc and Sd are connected in series. The switching elements Sa and Sb operate in a pair, and the switching elements Sc and Sd operate in a pair; two pairs of the switching elements alternately turn on or off.

In this case, as disclosed in FIG. 3 on page 67 of Non-patent Document 1, for example, if the switching elements Sa and Sd have the same turn-on time Ton and are in phase with each other and the switching elements Sb and Sc also have the same turn-on time Ton and are in phase with each other, the output voltage can be controlled by a ratio of the turn-on time Ton to the switching cycle T. However, if switching is thus controlled, hard switching occurs at on/off action of each switching element, resulting in large switching loss and decreasing conversion efficiency.

In an example disclosed in FIG. 6 on page 67 of Non-patent Document 1, therefore, so-called phase-shift control is performed by shifting the turn-on phase between the switching elements Sa and Sd and shifting the turn-on phase between the switching elements Sb and Sc, thereby enabling zero voltage switching (ZVS), i.e., enabling the switch to be turned on as the voltage across each switching element becomes zero, based on the resonance between the parasitic capacitances (capacitances between both ends) Ca, Cb, Cc and Cd of the individual switching elements and the leakage inductance LIk1 of the transformer's primary winding. With this control, the current and voltage cross time at the switching edge can be decreased to reduce the switching loss.

At this time, ZVS or so-called soft-switching can be realized such that when the switching elements Sa and Sd are kept turned on and the switching element Sd is then turned off while the switching element Sa remains turned on, the leakage inductance LIk1 tends to hold current, and the current held by this inductor charges or discharges the parasitic capacitances Cd and. Cc, whereby the voltage Vd across the switching element Sd cannot rise to the input voltage Vin rapidly, while the switching element Sc is turned on after the voltage Vc across the switching element Sc drops from Vin to 0V with a delay. As described above, ZVS is attributed to the resonance between the parasitic capacitance between both ends of the switching element and the leakage inductance LIk1, i.e., the exchange of energy stored in the inductor with the capacitance.

At light load during which a small amount of power is supplied to the secondary side, therefore, since only a small amount of current flows through the circuit, the phase-shifted ZVS full bridge circuit needs a primary resonance inductor having a large inductance. At heavy load during which a large amount of power is supplied to the secondary side, on the other hand, since a large amount of current flows through the circuit, the primary resonance inductance may be small. This is because, since the energy stored in the inductor for ZVS has a large current, even a small inductance can resonate with the parasitic capacitance between both ends of the switching element. In this case, rather, as the inductance decreases, the resonance delay time can be shortened to reduce the waiting time before transmitting the power to the secondary side. The resonance delay time is called "commutation overlap period" which reduces the maximum output voltage of the power supply.

In a DC-to-DC converter disclosed in Japanese Unexamined Patent Application Publication No. 2004-260928, therefore, an external inductance is connected in series with the leakage inductance of the transformer's primary winding so as to solve the above-mentioned problem. An external switch is connected in parallel with the external inductance so that the external switch can be turned on or off by a switching signal generator provided in a control circuit.

During light load operation, the external switch is turned off to have a large inductance that is the sum of the leakage inductance and the external inductance, realizing ZVS; during heavy load operation, the external switch is turned on to have a small inductance that is only of the leakage inductance, preventing the reduction of the maximum output voltage.

In order to turn on or off the external switch, however, the DC-to-DC converter disclosed in Japanese Unexamined Patent Application Publication No. 2004-260928 needs a detector which can distinguish between heavy load operation and light load operation by detecting the current flowing through the primary winding. Moreover, since the external switch may frequently turn on and off at the boundary between heavy load operation and light load operation, an additional countermeasure is also needed. Therefore, the circuit configuration becomes very complicated.

SUMMARY OF THE INVENTION

The present invention is to solve the above-mentioned problem of the related art and has an object to provide a DC-to-DC converter which enables ZVS during light load operation and prevents the reduction of maximum output voltage during heavy load operation without the necessity for any complicated circuit element.

The present invention provides a DC-to-DC converter comprising a voltage converter having: a capacitance; at least one inductor configured to store energy and exchange stored energy with the capacitance; and a switching element configured to switch on and off a current flowing through the inductor and change direction of the current at each switching, the inductor including a variable inductor whose inductance decreases with increase in the current.

In the DC-to-DC converter according to the present invention, the variable inductor may be configured to serve as a resonance inductor in a resonance circuit.

The resonance inductor may be composed of or include the variable inductor and a leakage inductance of a transformer.

In the DC-to-DC converter according to the present invention, a plurality of the switching elements may constitute a full bridge circuit, the individual switching elements being configured to operate under phase-shift control.

In the DC-to-DC converter according to the present invention, preferably, the variable inductor has an inductance variation DL equal to or greater than 4% and equal to or less than 31%, where the inductance variation DL is given by (L0−Lm)/L0, L0 represents an initial inductance with no current flowing through the inductor, and Lm represents an inductance with a rated current flowing through the inductor.

Moreover, the DC-to-DC converter preferably has a Tco improvement index Dt equal to or greater than 2.44% and equal to or less than 41.46%, where the Tco improvement index Dt is given by {(Tco=0)−Tco}/(Tco=0), Tco represents a commutation overlap period upon employment of the variable inductor, and Tco=0 represents a commutation overlap period upon employment of a comparison inductor whose inductance does not vary with the current, the commutation overlap period being a period during which power conversion is impossible through the transformer configured to transmit power in zero voltage switching mode.

Furthermore, the DC-to-DC converter preferably has a circuit performance index Fz equal to or greater than 0.16 and equal to or less than 0.69, where Pc0 represents a core loss with the rated current flowing through the comparison inductor, Pc represents a core loss with the rated current flowing through the variable inductor, (1/DPc) represents a core loss increase suppression index given by Pc0/(Pc−Pc0), and (1/DPc)*Dt being product of the core loss increase suppression index (1/DPc) and the Tco improvement index Dt represents the circuit performance index Fz.

The DC-to-DC converter according to the present invention enables zero voltage switching during light weight operation and also enables shortening of the commutation overlap period Tco, increasing the maximum transmission power.

Moreover, the present invention may also be used to increase the control response speed of the DC-to-DC converter, e.g., immediately change the output voltage in a switching circuit which exchanges energy between a capacitance on the circuit and an inductor. By improving the fast response in voltage control of the switched-mode power supply, there can be obtained another effect such as reduction of waiting time before stabilization of voltage.

The present invention will be more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1:
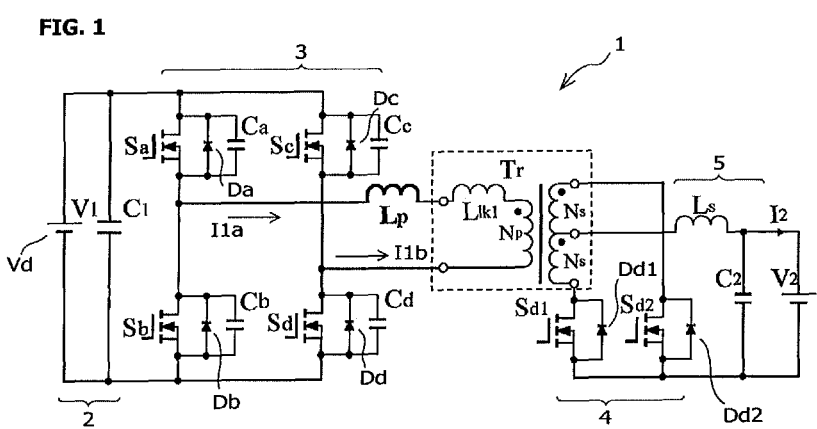
FIG. 1 is a circuit diagram showing an embodiment of an isolated-type DC-to-DC converter employing a switching circuit according to the present invention.

FIG. 1 is a circuit diagram showing an isolated-type DC-to-DC converter 1 as an embodiment according to the present invention.

The isolated-type DC-to-DC converter 1 shown in FIG. 1 includes a switching circuit. The switching circuit is composed of a primary DC power supply Vd, four primary switching elements Sa, Sb, Sc and Sd, a transformer Tr, and a variable inductor Lp for primary resonance.

The DC-to-DC converter 1 has a rectifier circuit 4 and a smoothing circuit 5 on the secondary side, so that the power transformed by the transformer Tr can be converted to a DC power and applied to a load. In the embodiment shown in FIG. 1, the secondary load is a secondary battery V2, so that the DC power converted to the secondary side can be stored in the secondary battery V2. For example, the primary DC power supply Vd is a power-generating power supply such as a solar panel.

In the DC-to-DC converter 1 shown in FIG. 1, since the variable inductor Lp is provided on the primary side, the zero voltage switching conditions can be satisfied at light load, while the commutation overlap period at heavy load can be shortened to increase the maximum transmission power from the primary side to the secondary side. According to the present invention, contrary to FIG. 1, the variable inductor Lp may be provided on the secondary side. The variable inductor Lp may be positioned on either of the input and output sides of the DC-to-DC converter 1. In the embodiment described with reference to FIG. 1 and so on, since the variable inductor Lp is provided on the input side, the maximum transmission power can be increased and the losses due to core loss can be reduced to ensure the fast response.

The DC-to-DC converter 1 according to the present invention is not limited to the one that employs the secondary battery V2 as the secondary load; the load may be replaced by various types of electronic circuits or an electromagnetic actuator such as a relay or a motor.

The primary capacitor C1 is a smoothing capacitor, and the primary DC power supply Vd and the capacitor C1 constitute an input DC power supply 2.

For example, the input DC power supply 2 is a solar panel that varies in voltage or current. In the present invention, the input DC power supply 2 is not limited to the one that varies in voltage or current and may be replaced by a common battery or an AC-to-DC conversion-type DC power supply. Even with such a power supply, the effect of the present invention will be demonstrated during both light load operation and heavy load operation. In other words, according to the present invention, when the input power or the output load varies greatly, the high efficiency of the phase-shifted full bridge ZVS mode can be achieved at lighter load, and the maximum transmission power can be increased at heavier load, resulting in greater improvement.

In the embodiment shown in FIG. 1, the input DC power supply 2 and the full bridge circuit 3 constitute a voltage converter (switch part). In the voltage converter, the DC power is supplied from the input DC power supply 2 to the full bridge circuit 3. The full bridge circuit 3 is composed of four switching elements Sa, Sb, Sc and Sd. Each of the switching elements Sa, Sb, Sc and Sd is a FET (field-effect transistor), and parallel-connected body diodes Da, Db, Dc and Dd are incorporated into the switching elements Sa, Sb, Sc and Sd, respectively. The diodes Da, Db, Dc and Dd may be replaced by external diodes. In this case, the cathode of each diode should be connected to the drain of the switching element (FET), while the anode should be connected to the source. FIG. 1 also shows parasitic capacitances (capacitance between both ends) Ca, Cb, Cc and Cd of the individual switching elements Sa, Sb, Sc and Sd. These capacitances may be replaced by external capacitors.

The transformer Tr has a primary coil Np and a secondary coil Ns. Llk1 represents the leakage inductance of the transformer Tr.

The variable inductor Lp is positioned in the current path from the full bridge circuit 3 to the primary coil Np. The variable inductor Lp is a primary resonance inductor, one end of which is connected to the anode of the diode Da and the cathode of the diode Db, while the other end is connected to the primary coil Np. Alternatively, the variable inductor Lp may be provided such that one end is connected to the anode of the diode Dc and the cathode of the diode Dd, while the other end is connected to the primary coil Np.

In this circuit, the primary coil Np, the leakage inductance Llk1 and the variable inductor Lp serve as an energy-storing inductor.

On the secondary side, as shown in FIG. 1, there are provided the bridge circuit 4 capable of serving as a rectifier circuit and the smoothing circuit 5. The bridge circuit 4 has secondary switching elements Sd1 and Sd2. Each of the switching elements Sd1 and Sd2 is a FET. Diodes Dd1 and Dd2 are connected in parallel with the switching elements Sd1 and Sd2, respectively. In this case, the diode may be a body diode of each switching element. The individual diodes Dd1 and Dd2 are provided such that the cathode is connected to the drain of each switching element, i.e., FET, while the anode is connected to the source.

The smoothing circuit 5 is composed of a smoothing reactor Ls and a smoothing capacitor C2. On the secondary side, the DC current flowing in the direction of $I_2$ after the transformation through the transformer Tr, the rectification and the smoothing can be stored in the secondary battery V2.

Now will be described the operation of the DC-to-DC converter 1 shown in FIG. 1, during which the DC power from the primary DC power supply 2 is transformed by the transformer Tr and stored in the secondary battery V2.

Figure 4:
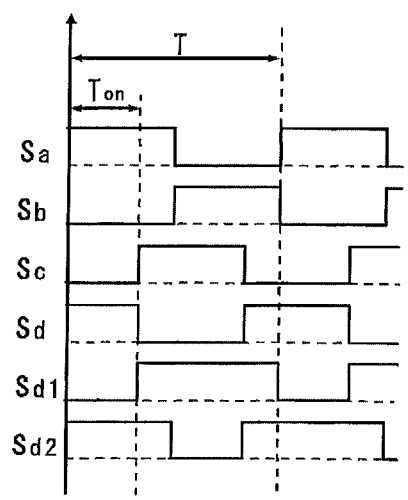
FIG. 4 is a timing chart showing the operation of phase-shift controlled switching elements in a full bridge circuit.

FIG. 4 shows the switch timing of the primary switching elements Sa, Sb, Sc and Sd of the full bridge circuit 3 and the secondary switching elements Sd1 and Sd2. The individual switching elements can be switched with a switching control circuit operated according to the instruction of a control circuit (not shown).

As shown in FIG. 4, on the primary side, first, among the switching elements connected into two series circuits, the switching element Sa having a higher potential in one series circuit and the switching element Sd having a lower potential in the other series circuit are turned on at about the same time. As a result, the current I1a shown in FIG. 1 flows through the variable inductor Lp. Then, the switching element Sb having a lower potential in one series circuit and the switching element Sc having a higher potential in the other series circuit are turned on at about the same time, so that the current I1b shown in FIG. 1 flows through the variable inductor Lp. By performing such switching operations alternately at a given frequency, AC voltage can be applied to the primary side of the transformer Tr, and transformed AC voltage can be obtained on the secondary side of the transformer Tr.

Moreover, the secondary switching element Sd2 is turned on in a timely manner with the turning on of the primary switching elements Sa and Sd, and the secondary switching element Sd1 is turned on in a timely manner with the turning on of the primary switching elements Sb and Sc. With such switching operations, the AC power induced on the secondary side of the transformer Tr can be rectified by the bridge circuit 4. The current rectified by the bridge circuit 4 can be smoothed and converted into a DC voltage by the smoothing circuit 5 such that the current flows in the direction of $I_2$ and then stored in the secondary battery V2.

FIG. 4 shows the timing of phase-shifted switching, wherein the switching elements Sa and Sd to be turned on and off at about the same time are out of phase with each other, and the switching elements Sb and Sc to be turned on and off at about the same time are also out of phase with each other. This phase-shifted operation enables zero voltage switching (ZVS), reducing the switching loss.

In the switching operation of FIG. 4, although the duty cycle of operation of each switching element is 0.5 T, the calculated duty cycle is Ton/0.5 T, where Ton represents the period during which both the switching elements Sa and Sd remain in on-state.

Figure 5:
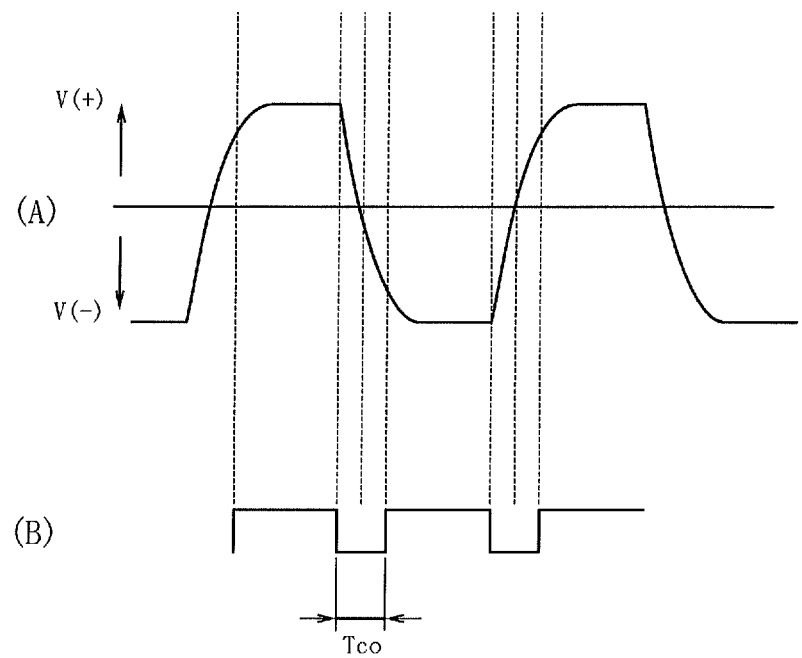
FIG. 5 is a diagram showing the commutation overlap period Tco in the DC-to-DC converter.

In the part (A), FIG. 5 shows how the voltage applied to the primary coil Np of the transformer Tr varies during ZVS with the full bridge circuit 3 being controlled according to the phase-shift control shown in FIG. 4. In ZVS, the commutation overlap period Tco during which electric energy cannot be transmitted to the secondary side extends over a given length with center at the zero crossing point of the voltage. The shorter the commutation overlap period Tco, the larger the maximum transmission power of the isolated-type DC-to-DC converter.

In order to realize ZVS, the following condition should be satisfied.

$L_1$ represents the total inductance, i.e., the sum of the inductance of the variable inductor Lp and the leakage inductance LIk1 shown in FIG. 1. I (variable) represents the current flowing through the primary coil Np during ZVS, and C represents the individual capacitance values of the parasitic capacitances Ca, Cb, Cc and Cd. Moreover, $V_1$ represents the input voltage of the DC power generated at the primary input DC power supply 2.

In this case, the energy EL stored in the variable inductor Lp and the leakage inductance LIk1 satisfies that $EL=(1/2)L_1*I^2$.

One of the switching elements Sa and Sb connected in series is turned off, and at about the same time, one of the switching elements Sc and Sd is turned off, too. Since the voltage across the parasitic capacitance associated with the turned-off switching element is $V_1$, the energy stored in the parasitic capacitance associated with a single turned-off switching element can be represented by $(1/2)C*V_1^2$. Since two switching elements to be turned off at about the same time are connected in parallel, the total energy stored in the parasitic capacitances associated with two turned-off switching elements satisfies that $Ec=C*V_1^2$.

In order to realize the zero voltage switching shown in FIG. 5, the energy EL stored in the variable inductor Lp and the leakage inductance LIk1 should be larger than the total energy Ec stored in the parasitic capacitances. That is, the condition for realization of the zero voltage switching is as follows:

$$EL=(1/2)L_1*I^2>Ec=C*V_1^2.$$

It should be noted that during the light load operation in which the current I from the primary input DC power supply 2 decreases, if the inductance $L_1$ is not large, ZVS cannot be realized and hard switching occurs to increase the switching loss. In order to store the power in the secondary battery V2 without increasing the loss during the light load operation in the DC-to-DC converter 1, accordingly, the inductance $L_1$ should be set to a large value beforehand.

On the other hand, the commutation overlap period Tco during which the power cannot be transmitted through the transformer Tr during ZVS, as shown in FIG. 5, can be calculated from the following formula:

$$Tco=2*I_2(Ns/Np)*(L_1/V_1), \text{ where}$$

$I_2$ represents the value of smoothed current flowing on the secondary side during ZVS, and (Ns/Np) represents the turns ratio of the transformer Tr. As understood from the above formula, the larger the primary inductance $L_1$, the longer the commutation overlap period Tco.

In the phase-shift control shown in FIG. 4, the duty cycle of the switching operation is Ton/0.5 T, but since the commutation overlap period Tco exists, the effective duty cycle during which the power can be converted by the transformer Tr is (Ton−Tco)/0.5 T. Since the voltage will be converted to the secondary side in proportion to the duty cycle, the commutation overlap period Tco increases with increase in $I_2$ (which applies a heavy load), reducing the output voltage.

In the isolated-type DC-to-DC converter 1 shown in FIG. 1, therefore, the variable inductor Lp is employed as a primary resonance inductor. Throughout the description, the variable inductor Lp is a resonance inductor that has a large inductance at light load but has a small inductance at heavy load of the power supplied to the inductor. In order to realize the zero voltage switching during the light load operation, the initial inductance of the variable inductor Lp should be set to a relatively large value. Since the inductance decreases with increase in current value at heavy load, the commutation overlap period Tco, which can be calculated from the above-mentioned formula, can be shortened to prevent the reduction of output voltage during the heavy load operation and increase the maximum transmission power.

Figure 2:
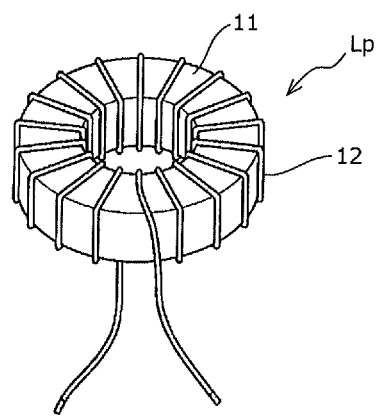
FIG. 2 is a drawing showing an exemplary structure of a variable inductor Lp.

The variable inductor Lp is constructed such that a conductor 12 is wound around a ring-shaped core 11, as shown in FIG. 2. In this embodiment, the variable inductor whose inductance decreases with increase in current is produced by making the combined use of the magnetic material constituting the core 11, the magnetic path length of the core 11, the effective core area of the core 11, the effective volume of the core 11, and the turns of the conductor 12. Regarding the shape of the core 11, the above-described structure is a mere example and not limited to the ring-shape.

The core 11 of the variable inductor Lp may be a dust core or a distributed gap core. Examples of the magnetic material constituting such a core include a Fe-based amorphous soft magnetic alloy and a Fe-based crystalline soft magnetic alloy (Fe—Al—Si alloy, Fe—Si alloy, or Fe—Si—Cr alloy). Among them, a Fe—P—C amorphous soft magnetic alloy is preferably used.

In the foregoing embodiment, since the variable inductor Lp whose inductance decreases with increase in current is employed, as described above, it is no longer required to provide a switch for inductance switching and a switching circuit, unlike in the related art, which also eliminates the necessity for providing a load detector for operation of the switching circuit.

EXAMPLES

Inductors 1, 2, 3, 4, 5, 6 and 7 were prepared as examples of the variable inductor Lp according to the present invention.

The materials of the individual inductor cores 11 were as follows:

(a) Inductor 1 & Inductor 2

The core was produced by powder compaction from a magnetic powder of a Fe—Si—B amorphous material.

(b) Inductor 3 & Inductor 4

The core was produced by powder compaction from a magnetic powder of a Fe—P—C amorphous material.

(c) Inductor 5, Inductor 6 & Inductor 7

The core was produced by powder compaction from a Fe—Al—Si magnetic powder (Sendust).

In all the inductors, i.e., the inductors 1 through 7, the inductance was set to 13 µH. The value 13 µH means that the initial inductance L0 with no current flowing through the inductor was set to 13 µH. When the initial inductance L0 is 13 µH, the zero voltage switching at light load can be realized in an experimental circuit identical to that shown in FIG. 1.

The effective magnetic path length Le, the effective core area Ae, the effective core volume Ve, and the turns of the conductor in the core used for each inductor are shown in the following Table 1. Table 1 also shows the primary rated magnetomotive force (ampere-turn) in the case where a direct current (rated current of 12 A (ampere)) was applied to each inductor. It should be noted that the rated current of 12 A refers to the peak value of the current flowing through the inductor in the case when the DC-to-DC converter employed for the examples was steadily operated to have a rated output current specified for the DC-to-DC converter.

TABLE 1

|  | Effective Magnetic Path Le [mm] | Effective Core Area Ae [mm] | Effective Core Volume Ve [mm⁻3] | Turns of Coil | Primary Rated Magnetomotive Force [AT] |
| --- | --- | --- | --- | --- | --- |
| Inductor 1 | 62 | 140 | 8649 | 9 | 108 |
| Inductor 2 | 62 | 67 | 4146 | 13 | 156 |
| Inductor 3 | 98 | 107 | 10549 | 20 | 240 |
| Inductor 4 | 42 | 58 | 2423 | 12 | 144 |
| Inductor 5 | 42 | 38 | 1579 | 15 | 180 |
| Inductor 6 | 62 | 76 | 4709 | 12 | 144 |
| Inductor 7 | 62 | 70 | 4290 | 10 | 120 |

In regard to the inductors 1 to 7, which are examples of the variable inductor Lp, FIG. 3A to FIG. 3G show how the inductance varies with increase in current from the initial inductance L0 (13 µH) at zero current. In FIG. 3A to FIG. 3G, the abscissa represents the value (between 0 and the maximum value) of the direct current applied to the winding of the inductor (in ampere). In the inductors 1 to 7, the inductance at the rated current of 12 A can be represented by Lm. When the value expressed by (L0−Lm)/L0 is defined as the inductance variation DL, the rated inductance Lm and the inductance variation DL of each inductor shown in the following Table 2 can be obtained from the relationship between the inductor's current and the inductance shown in FIG. 3A to FIG. 3G.

TABLE 2

|  | Lm | DL (Lo − Lm)/L0 |
| --- | --- | --- |
| Inductor 1 | 10.5 | 20% |
| Inductor 2 | 9.6 | 26% |
| Inductor 3 | 12.5 | 4% |
| Inductor 4 | 9.8 | 25% |
| Inductor 5 | 9.1 | 30% |
| Inductor 6 | 10.9 | 17% |
| Inductor 7 | 8.9 | 31% |

In Table 2, the inductors 1 to 7 employed as the variable inductor Lp have an inductance variation DL equal to or greater than 4% and equal to or less than 31%.

Figure 6:
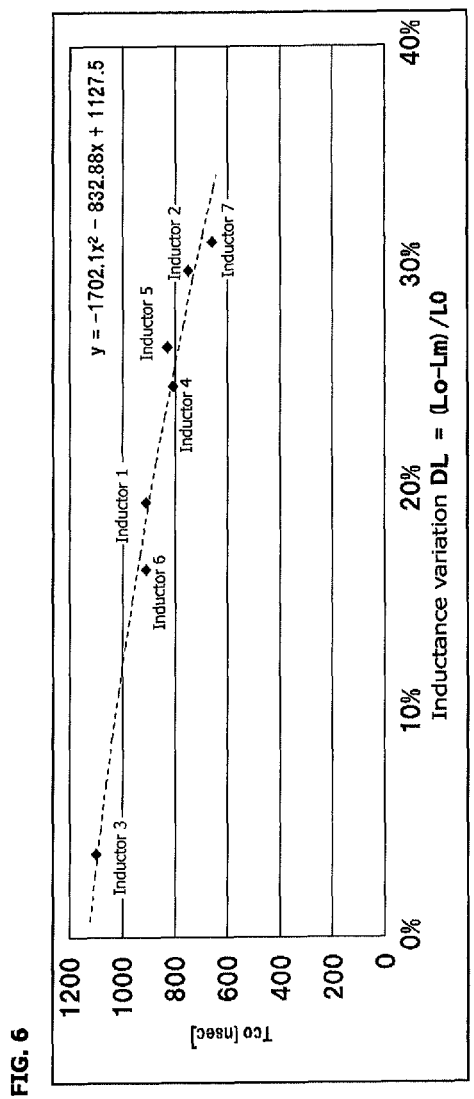
FIG. 6 is a diagram showing a relationship between the inductance variation DL and the commutation overlap period Tco in the case where the inductors 1 to 7 are employed.

Then, the DC-to-DC converter 1 shown in FIG. 1, in which the inductors 1 to 7 were employed as the variable inductor Lp, was put into operation, and the commutation overlap period Tco in the case where the peak value of the current flowing through the variable inductor Lp (i.e., the rated current) was set to 12 A (ampere) was measured by an experiment. In FIG. 6, the abscissa represents the inductance variation DL, while the ordinate represents the commutation overlap period Tco. From FIG. 6, it is understood that the larger the inductance variation DL, the shorter the commutation overlap period Tco, so that the effective switching duty can be increased at heavy load to increase the maximum transmission power.

Figure 3A:
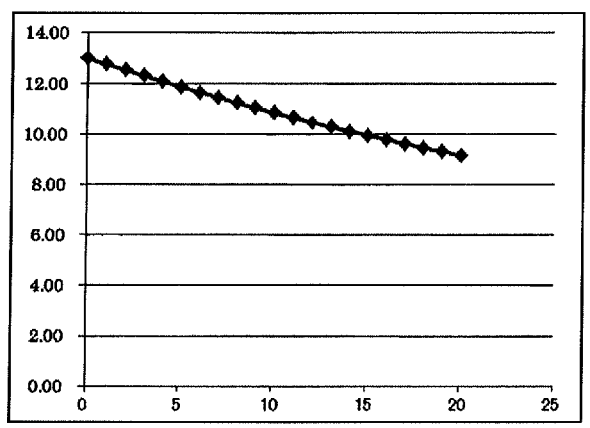
FIG. 3A is a diagram showing inductance variation characteristics with respect to the current value of an inductor 1.
Figure 3B:
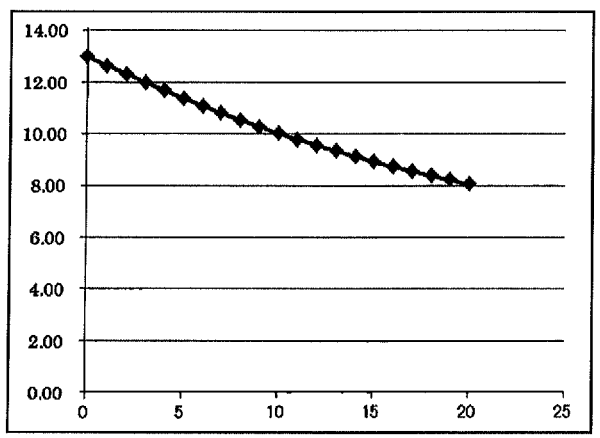
FIG. 3B is a diagram showing inductance variation characteristics with respect to the current value of an inductor 2.
Figure 3C:
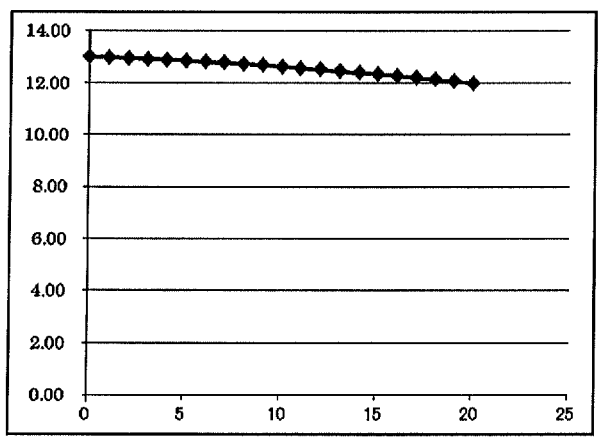
FIG. 3C is a diagram showing inductance variation characteristics with respect to the current value of an inductor 3.
Figure 3D:
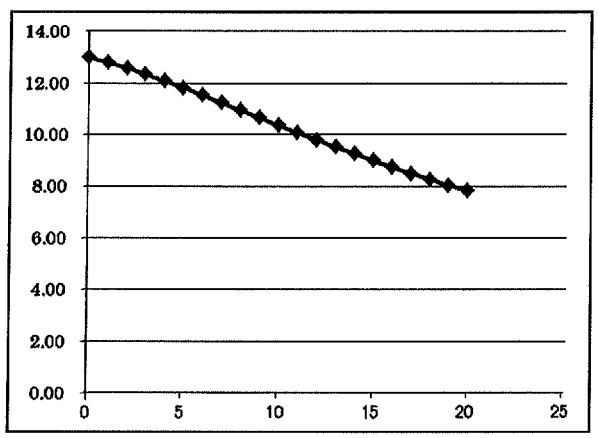
FIG. 3D is a diagram showing inductance variation characteristics with respect to the current value of an inductor 4.
Figure 3E:
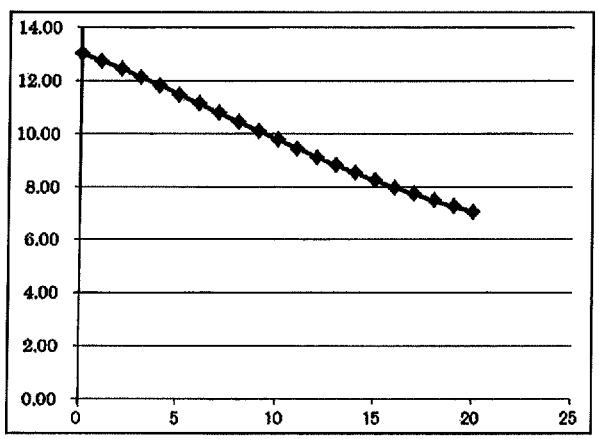
FIG. 3E is a diagram showing inductance variation characteristics with respect to the current value of an inductor 5.
Figure 3F:
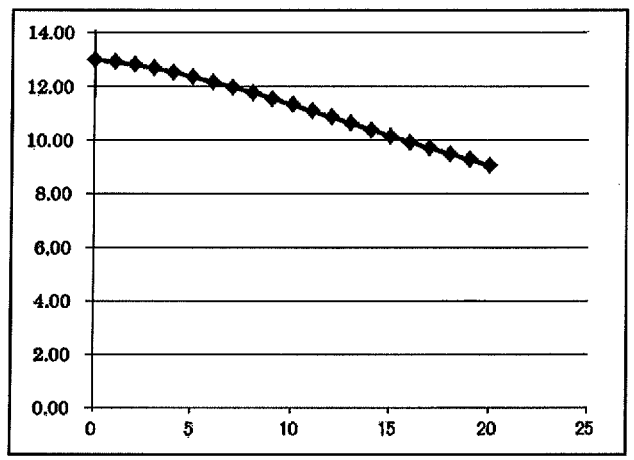
FIG. 3F is a diagram showing inductance variation characteristics with respect to the current value of an inductor 6.
Figure 3G:
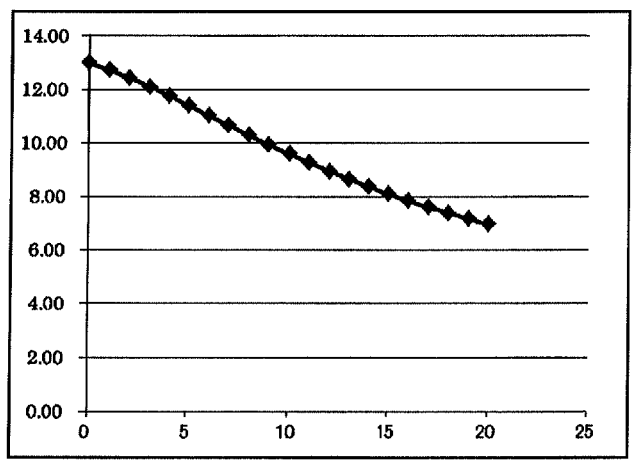
FIG. 3G is a diagram showing inductance variation characteristics with respect to the current value of an inductor 7.
Figure 3H:
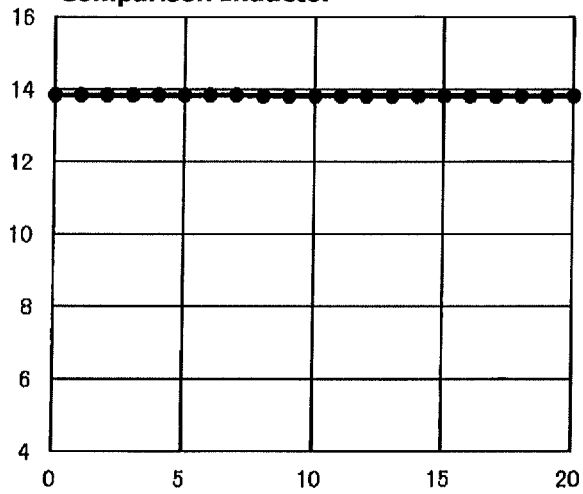
FIG. 3H is a diagram showing inductance variation characteristics with respect to the current value of a comparison inductor.

FIG. 3H shows the characteristics of comparison inductance: the abscissa shows the increase in current, while the ordinate shows the inductance variation. Throughout the description, the term "comparison inductor" refers to an inductor having a core made of a magnetic material whose inductance hardly varies between light load and heavy load of the power supplied to the inductor. In the comparison inductor shown in FIG. 3H, the magnetic material of the core was a ferrite (PC95 manufactured by TDK Corporation), and the initial inductance was set to 13 µH as the direct current supplied to the winding of the inductor was 0 A (ampere). In this comparison inductor, as shown in FIG. 3H, the inductance hardly varies with current. With this comparison inductor, the commutation overlap period (Tco=0) was measured in the same manner.

Figure 7:
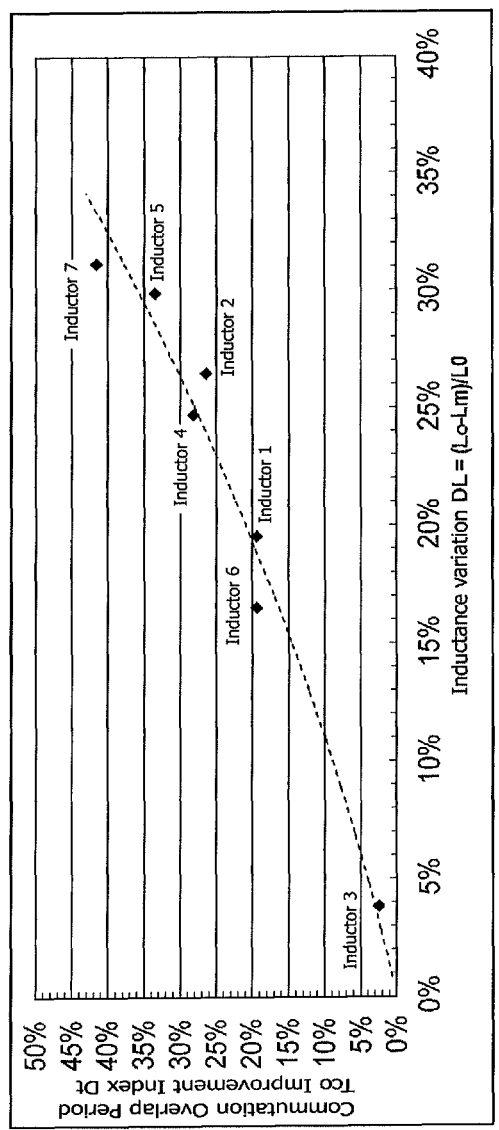
FIG. 7 is a diagram showing a relationship between the inductance variation DL and the Tco improvement index Dt in the case where the inductors 1 to 7 are employed.

Then, the Tco improvement index Dt given by {(Tco=0)−Tco}/(Tco=0) was calculated for the circuit employing each individual inductor. The following Table 3 shows the commutation overlap period Tco and the Tco improvement index of each example at the rated current (12 A). In FIG. 7, the abscissa represents the inductance variation DL, while the ordinate represents the Tco improvement index Dt.

TABLE 3

|  | Lm | DL (Lo − Lm)/L0 | Tco [nsec] | TCO Improvement Index Dt |
| --- | --- | --- | --- | --- |
| Inductor 1 | 10.5 | 20% | 910 | 19.29% |
| Inductor 2 | 9.6 | 26% | 830 | 26.39% |
| Inductor 3 | 12.5 | 4% | 1100 | 2.44% |
| Inductor 4 | 9.8 | 25% | 810 | 28.16% |
| Inductor 5 | 9.1 | 30% | 750 | 33.48% |
| Inductor 6 | 10.9 | 17% | 910 | 19.29% |
| Inductor 7 | 8.9 | 31% | 660 | 41.46% |

In the examples according to the present invention, as seen from Table 3 and FIG. 7, the Tco improvement index Dt is equal to or greater than 2.44% and equal to or less than 41.46%.

Figure 8:
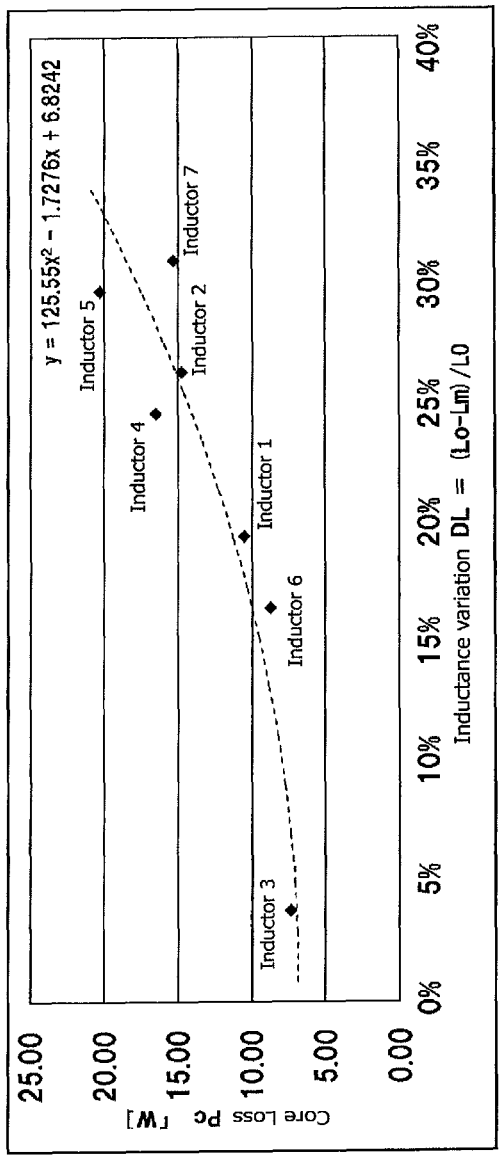
FIG. 8 is a diagram showing a relationship between the inductance variation DL and the core loss in the case where the inductors 1 to 7 are employed.

In the inductors 1 to 7 shown in FIG. 3A through FIG. 3G, moreover, it is understood that L drops greatly in so-called DC bias characteristics to have a high density of magnetic flux induced into the core by the individual currents. Therefore, the core loss increases at the rated current (12 A). The large core loss generates heat, so that the core loss decreases the power conversion efficiency and a countermeasure against heat generation hinders downsizing of the DC-to-DC converter. In FIG. 8, the abscissa represents the inductance variation DL, while the ordinate represents the core loss during the operation at the rated current (12 A).

The core loss show in FIG. 8 was obtained such that core losses of the inductors 1 to 7 (examples) and the comparison inductor were measured by a B-H analyzer ("SY-8218" manufactured by Iwatsu Electric Co., Ltd.), the inductor's current waveform was measured as the rated current was flowing through the experimental circuit identical to that shown in FIG. 1, and the core loss Pc during the rated operation of the circuit was calculated from them.

In addition, the core loss Pc0 was also obtained with the comparison inductor (whose inductance does not vary with the current) employed and operated at the rated current (12 A). The value obtained from Pc0/(Pc−Pc0) can be defined as the core loss increase suppression index (1/DPc), where Pc represents the core loss in the case where the inductors 1 to 7 were employed as examples and operated at the rated current (12 A).

The following Table 4 shows the core loss Pc and the core loss increase suppression index (1/DPc) in the case where the inductors 1 to 7 were employed as examples.

TABLE 4

| | Lm | DL (Lo − Lm)/L0 | Pc | 1/DPc |
|---|---|---|---|---|
| Inductor 1 | 10.5 | 20% | 10.50 | 1.82 |
| Inductor 2 | 9.6 | 26% | 14.78 | 0.84 |
| Inductor 3 | 12.5 | 4% | 7.32 | 13.97 |
| Inductor 4 | 9.8 | 25% | 16.51 | 0.69 |
| Inductor 5 | 9.1 | 30% | 20.32 | 0.49 |
| Inductor 6 | 10.9 | 17% | 8.70 | 3.57 |
| Inductor 7 | 8.9 | 31% | 15.34 | 0.78 |

Figure 9:
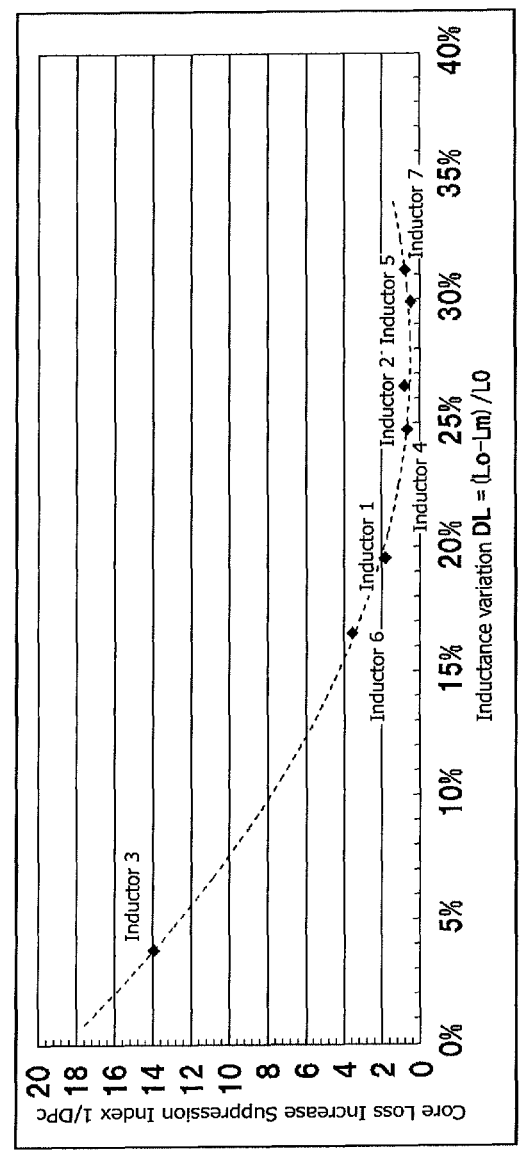
FIG. 9 is a diagram showing a relationship between the inductance variation DL and the core loss increase suppression index (1/DPc) in the case where the inductors 1 to 7 are employed.

In FIG. 9, the abscissa represents the inductance variation DL, while the ordinate represents the core loss increase suppression index (1/DPc). The core loss increase suppression index (1/DPc) is an index showing how much the increase in core loss can be suppressed during heavy load operation with the rated current at 12 A. From FIG. 9, it is seen that the core loss cannot easily be suppressed in the case where the inductors 1 to 7 were employed as examples.

In summary, when the variable inductor Lp is employed, the larger the inductance variation DL, the shorter the commutation overlap period Tco, so that the Tco improvement index Dt can be improved to prevent the reduction of output voltage before heavy load and increase the maximum transmission power, as shown in Table 3 and FIG. 7, but there is also an opposite feature of deteriorating the core loss increase suppression index (1/DPc) with increase in the inductance variation DL, as shown in Table 4 and FIG. 9.

Figure 10:
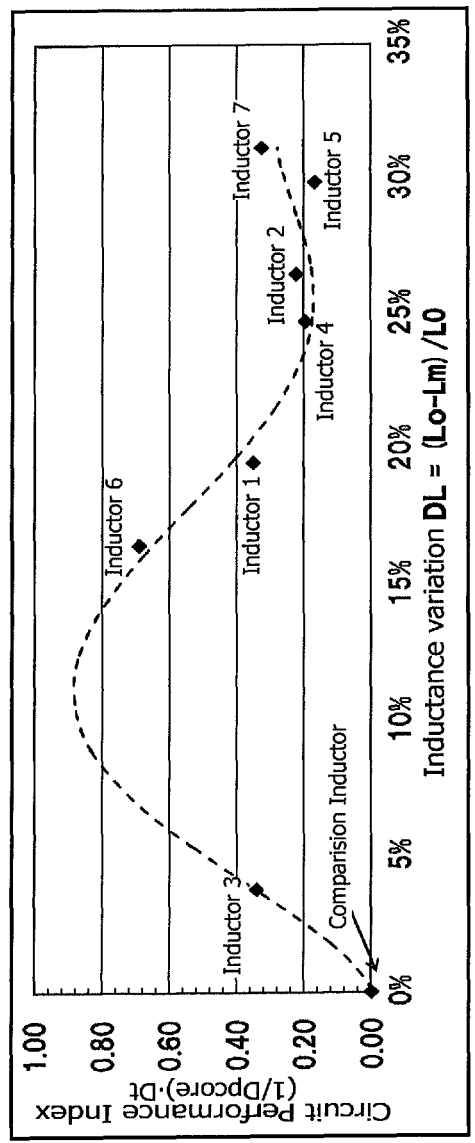
FIG. 10 is a diagram showing a relationship between the inductance variation DL and the circuit performance index Fz=(1/DPc)*Dt in the case where the inductors 1 to 7 are employed.
Figure 11:
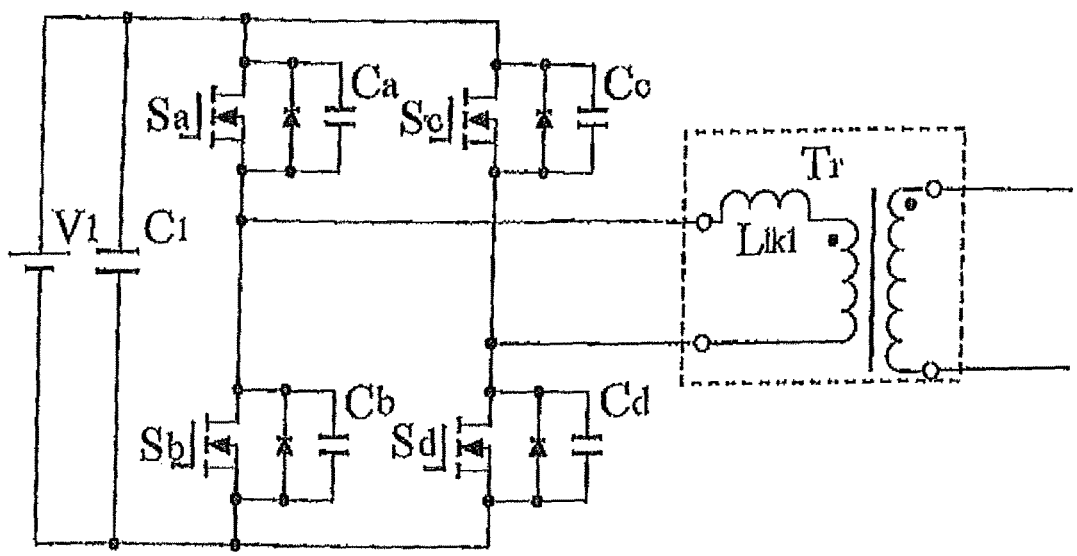
FIG. 11 is a circuit diagram of a conventional isolated-type DC-to-DC converter.

Therefore, the product of the opposite indices, i.e., (1/DPc)*Dt is taken as the circuit performance index Fz. The following Table 5 shows the circuit performance index Fz in the case where the inductors 1 to 7 were employed as examples. In FIG. 10, the abscissa represents the inductance variation DL, while the ordinate represents the circuit performance index Fz=(1/DPc)*Dt. Also, FIG. 10 shows a relationship between DL and Fz of the comparison inductor. DL and Fz of the comparison inductor are both zero.

TABLE 5

| | Lm | DL (Lo − Lm)/L0 | Pc | 1/DPc | TCOImprovement Index Dt | Circuit Performance Index Fz (1/DPc) · Dt |
|---|---|---|---|---|---|---|
| Inductor 1 | 10.5 | 20% | 10.50 | 1.82 | 19% | 0.35 |
| Inductor 2 | 9.6 | 26% | 14.78 | 0.84 | 26% | 0.22 |
| Inductor 3 | 12.5 | 4% | 7.32 | 13.97 | 2% | 0.34 |
| Inductor 4 | 9.8 | 25% | 16.51 | 0.69 | 28% | 0.19 |
| Inductor 5 | 9.1 | 30% | 20.32 | 0.49 | 33% | 0.16 |
| Inductor 6 | 10.9 | 17% | 8.70 | 3.57 | 19% | 0.69 |
| Inductor 7 | 8.9 | 31% | 15.34 | 0.78 | 41% | 0.52 |

From Table 5 and FIG. 10, it is understood that when the inductors 1 to 7 are employed as examples according to the present invention, the circuit performance index Fz=(1/DPc)*Dt becomes equal to or greater than 0.16%. Moreover, when the inductance variation DL falls within the range of 5 to 20, the circuit performance index Fz can be further improved to 0.3 or more.

The switching circuit according to the present invention may also be used as an isolated-type DC-to-DC converter having a secondary battery on the secondary side, a DC-to-DC converter having a circuit load on the secondary side, or a DC-to-DC converter having a load other than the transformer, e.g., a relay or a motor on the secondary side. It may also be embodied as a non-isolated-type buck-boost converter or buck converter.

While the present invention has been particularly shown and described with reference to embodiments thereof, it will be understood by those skilled in the art that various changes in form and detail may be made therein without departing from the spirit, scope and teaching of the invention.

What is claimed is:

1. A DC-to-DC converter comprising a voltage converter having: a capacitance; at least one inductor configured to store energy and exchange stored energy with the capacitance; and a plurality of switching elements constituting a full bridge circuit configured to switch on and off a current flowing through the inductor and change direction of the current at each switching to convert DC into AC,
   the inductor including a variable inductor whose inductance decreases with increase in the current, the variable inductor having an inductance variation DL given by (L0−Lm)/L0, wherein:
   L0 represents an initial inductance with no current flowing through the inductor, and
   Lm represents an inductance with a rated current flowing through the inductor.

2. The DC-to-DC converter according to claim 1, wherein the variable inductor is configured to serve as a resonance inductor in a resonance circuit.

3. The DC-to-DC converter according to claim 2, wherein the resonance inductor is composed of or includes the variable inductor and a leakage inductance of a transformer.

4. The DC-to-DC converter according to claim 3, wherein the individual switching elements in the plurality of switching elements are configured to operate under phase-shift control.

5. A DC-to-DC converter comprising a voltage converter having: a capacitance; at least one inductor configured to store energy and exchange stored energy with the capacitance; and a plurality of switching elements constituting a full bridge circuit and configured to switch on and off a current flowing through the inductor and change direction of the current at each switching to convert DC into AC, the inductor including a variable inductor whose inductance decreases with increase in the current, wherein:
   the variable inductor has an inductance variation DL equal to or greater than 4% and equal to or less than 31%, wherein:
   the inductance variation DL is given by (L0−Lm)/L0,
   L0 represents an initial inductance with no current flowing through the inductor, and
   Lm represents an inductance with a rated current flowing through the inductor.

6. The DC-to-DC converter according to claim 5, which has a Tco improvement index Dt equal to or greater than 2.44% and equal to or less than 41.46%, where
   the Tco improvement index Dt is given by {(Tco=0)−Tco}/(Tco=0),
   Tco represents a commutation overlap period upon employment of the variable inductor, wherein the variable inductor is configured to serve as a resonance inductor in a resonance circuit, and the resonance inductor is composed of or includes the variable inductor and a leakage inductance of a transformer, and
   Tco=0 represents a commutation overlap period upon employment of a comparison inductor whose inductance does not vary with the current, the commutation overlap period being a period during which power conversion is impossible through the transformer configured to transmit power in zero voltage switching mode.

7. The DC-to-DC converter according to claim 6, which has a circuit performance index Fz equal to or greater than 0.16 and equal to or less than 0.69, where Pc0 represents a core loss with the rated current flowing through the comparison inductor, Pc represents a core loss with the rated current flowing through the variable inductor, (1/DPc) represents a core loss increase suppression index given by Pc0/(Pc−Pc0), and (1/DPc)*Dt being product of the core loss increase suppression index (1/DPc) and the Tco improvement index Dt represents the circuit performance index Fz.

* * * * *

UNITED STATES PATENT AND TRADEMARK OFFICE
CERTIFICATE OF CORRECTION

PATENT NO. : 9,831,790 B2  
APPLICATION NO. : 14/857323  
DATED : November 28, 2017  
INVENTOR(S) : Takao Mizushima et al.

Page 1 of 1

It is certified that error appears in the above-identified patent and that said Letters Patent is hereby corrected as shown below:

On the Title Page

Left column, item (73), immediately after "ALPS ELECTRIC CO., LTD., Tokyo (JP)" insert --; TDK CORPORATION, Tokyo (JP)--.

Signed and Sealed this  
Twenty-seventh Day of August, 2019

Andrei Iancu  
*Director of the United States Patent and Trademark Office*